(12) United States Patent
Martinez

(10) Patent No.: US 8,799,249 B2
(45) Date of Patent: Aug. 5, 2014

(54) METHOD AND SYSTEM FOR RENDERING A COLLECTION OF MEDIA ITEMS

(75) Inventor: Ronald Martinez, San Francisco, CA (US)

(73) Assignee: Yahoo! Inc., Sunnyvale, CA (US)

(*) Notice: Subject to any disclaimer, the term of this patent is extended or adjusted under 35 U.S.C. 154(b) by 638 days.

(21) Appl. No.: 11/760,583

(22) Filed: Jun. 8, 2007

(65) Prior Publication Data

US 2008/0306998 A1    Dec. 11, 2008

(51) Int. Cl.
*G06F 17/30* (2006.01)

(52) U.S. Cl.
USPC ........... 707/705; 707/E17.001; 707/821; 709/217

(58) Field of Classification Search
CPC ............... G06F 17/30038; G06Q 30/02
USPC ......... 707/705, 802, 913, 999.003, 999.104, 707/E17.001, 821; 709/217
See application file for complete search history.

(56) References Cited

U.S. PATENT DOCUMENTS

| | | | | |
|---|---|---|---|---|
| 6,097,389 | A * | 8/2000 | Morris et al. | 715/804 |
| 6,202,061 | B1 * | 3/2001 | Khosla et al. | 1/1 |
| 6,418,447 | B1 * | 7/2002 | Frey et al. | 1/1 |
| 7,409,635 | B2 * | 8/2008 | Epstein | 715/243 |
| 7,636,509 | B2 * | 12/2009 | Davis | 386/239 |
| 7,647,385 | B2 * | 1/2010 | Encarnacion et al. | 709/217 |
| 7,689,616 | B2 * | 3/2010 | Peterson | 707/737 |
| 8,060,402 | B1 * | 11/2011 | Ranganath et al. | 705/14.73 |
| 8,131,591 | B2 * | 3/2012 | Gorty et al. | 705/14.4 |
| 8,442,858 | B1 * | 5/2013 | Barnes et al. | 705/14.26 |
| 8,484,075 | B1 * | 7/2013 | Yan et al. | 705/30 |
| 8,549,434 | B2 * | 10/2013 | Ouzts et al. | 715/838 |
| 2002/0046094 | A1 * | 4/2002 | Takekuma | 705/14 |
| 2002/0103698 | A1 * | 8/2002 | Cantrell | 705/14 |
| 2002/0184097 | A1 * | 12/2002 | Hijiri et al. | 705/14 |
| 2003/0130887 | A1 * | 7/2003 | Nathaniel | 705/14 |
| 2004/0158555 | A1 * | 8/2004 | Seedman et al. | 707/3 |
| 2004/0167928 | A1 * | 8/2004 | Anderson et al. | 707/104.1 |
| 2004/0194026 | A1 * | 9/2004 | Barrus et al. | 715/515 |
| 2004/0220926 | A1 * | 11/2004 | Lamkin et al. | 707/3 |
| 2004/0260767 | A1 * | 12/2004 | Kedem et al. | 709/203 |
| 2005/0086283 | A1 * | 4/2005 | Marshall | 709/200 |
| 2005/0138137 | A1 * | 6/2005 | Encarnacion et al. | 709/217 |
| 2005/0251444 | A1 * | 11/2005 | Varian et al. | 705/14 |
| 2005/0251513 | A1 * | 11/2005 | Tenazas | 707/3 |
| 2006/0041443 | A1 * | 2/2006 | Horvath | 705/1 |
| 2006/0074861 | A1 * | 4/2006 | Wilensky | 707/3 |
| 2006/0143082 | A1 * | 6/2006 | Ebert | 705/14 |
| 2006/0161621 | A1 * | 7/2006 | Rosenberg | 709/204 |
| 2006/0161635 | A1 * | 7/2006 | Lamkin et al. | 709/217 |
| 2006/0195902 | A1 * | 8/2006 | King et al. | 726/21 |
| 2006/0212350 | A1 * | 9/2006 | Ellis et al. | 705/14 |
| 2006/0293951 | A1 * | 12/2006 | Patel et al. | 705/14 |
| 2007/0028261 | A1 * | 2/2007 | Bouilloux-Lafont | 725/32 |

(Continued)

OTHER PUBLICATIONS

TinyURL.com—shorten that long URL into a Tiny URL [online] Gilby Productions © 2002-2007. [retrieved Jun. 8, 2007] Retrieved from the Internet: <http://tinyurl.com/>.

*Primary Examiner* — Phuong Thao Cao

(74) *Attorney, Agent, or Firm* — James J. DeCarlo; Greenberg Traurig, LLP

(57) ABSTRACT

The systems and methods disclosed herein relate to the identification, rendering, and publishing of collections of media items in an interactive computing environment.

40 Claims, 4 Drawing Sheets

(56) References Cited

U.S. PATENT DOCUMENTS

| | | | |
|---|---|---|---|
| 2007/0072676 A1* | 3/2007 | Baluja | 463/42 |
| 2007/0078709 A1* | 4/2007 | Rajaram | 705/14 |
| 2007/0083380 A1* | 4/2007 | Martinez | 705/1 |
| 2007/0083471 A1* | 4/2007 | Robbin et al. | 705/51 |
| 2007/0088609 A1* | 4/2007 | Reller et al. | 705/14 |
| 2007/0118606 A1* | 5/2007 | Duncan et al. | 709/217 |
| 2007/0130012 A1* | 6/2007 | Yruski et al. | 705/14 |
| 2007/0130014 A1* | 6/2007 | Altberg et al. | 705/14 |
| 2007/0134215 A1* | 6/2007 | Fukuda et al. | 424/93.21 |
| 2007/0174764 A1* | 7/2007 | Roseway et al. | 715/515 |
| 2007/0198346 A1* | 8/2007 | Beyda et al. | 705/14 |
| 2007/0208610 A1* | 9/2007 | Pisaris-Henderson et al. | 705/10 |
| 2007/0214132 A1* | 9/2007 | Grubb et al. | 707/5 |
| 2007/0220025 A1* | 9/2007 | Hyman | 707/101 |
| 2007/0234215 A1* | 10/2007 | Graham et al. | 715/723 |
| 2007/0245882 A1* | 10/2007 | Odenwald | 84/609 |
| 2007/0255693 A1* | 11/2007 | Ramaswamy et al. | 707/3 |
| 2007/0294621 A1* | 12/2007 | Hansen et al. | 715/716 |
| 2007/0294722 A1* | 12/2007 | Kang et al. | 725/34 |
| 2008/0082627 A1* | 4/2008 | Allen et al. | 709/217 |
| 2008/0102947 A1* | 5/2008 | Hays et al. | 463/31 |
| 2008/0140524 A1* | 6/2008 | Anand et al. | 705/14 |
| 2008/0163071 A1* | 7/2008 | Abbott et al. | 715/748 |
| 2008/0201446 A1* | 8/2008 | Svendsen | 709/218 |
| 2008/0262987 A1* | 10/2008 | Meadows | 706/12 |
| 2008/0263103 A1* | 10/2008 | McGregor et al. | 707/200 |
| 2008/0306815 A1* | 12/2008 | Dykes et al. | 705/14 |
| 2008/0306816 A1* | 12/2008 | Matthys et al. | 705/14 |
| 2009/0006177 A1* | 1/2009 | Beaver et al. | 705/10 |
| 2009/0070190 A1* | 3/2009 | Gorty et al. | 705/10 |
| 2009/0083186 A1* | 3/2009 | Dharmaji et al. | 705/50 |
| 2011/0015992 A1* | 1/2011 | Liffiton et al. | 705/14.46 |

* cited by examiner

METHOD AND SYSTEM FOR RENDERING A COLLECTION OF MEDIA ITEMS

BACKGROUND

The Internet and other networks commonly include many types of media items that may be rendered (i.e., played, displayed or consumed) by users in a variety of ways. For example, many social networking, blogs and other personalized sites render media items such as documents, audio, video, and imagery. Typically, media items that are included on Internet web pages and other network sites reside at particular network locations accessible only through hard-coded static references or network locations.

Increasingly, media providers, particularly those providing time-sensitive media items, wish to make media items available for a limited period of time or vary the collection (i.e., set) of media items that may be rendered by a user. For example, an online repository that accepts uploads of media items may provide static HTML links for a limited duration to media that may be embedded within a user's web page. When the online repository enforces the limited duration, the online repository often deletes or disables the media, thus producing a damaging effect in the user's web page embedding the static HTML link. As another example, a rights holder may release media items for use in a social networking site (e.g., Yahoo! 360 or MySpace) such that the media items are varied on a periodic (e.g., daily) basis. If a series of media items (e.g., short video clips from an upcoming movie) are designed to build toward an event (e.g., a movie release date), the rights holder may wish to vary the media items accessible from the same page that is repeatedly viewed by users. In such a case, if media items are statically referenced, the rights holder must manually update the page in conformance with their event schedule. As yet another example, an advertiser may wish to vary and/or track interaction with media items (e.g., advertisements) rendered on a web page. Particularly, for example, where media items are rendered using a static reference on a web page, the advertiser may be unable to determine when or how often the media item is rendered on a web page. As illustrated by these examples, systems and methods are needed for rendering a collection of media items that may change over a time period or change in some other way.

SUMMARY

Against this backdrop systems and methods have been developed for rendering a collection of media items. In one example (which example is intended to be illustrative and not restrictive), the present invention may be considered a method for rendering a collection of media items. The method includes assembling a collection of one or more media items, the collection identified by a key value. The method further includes receiving, from a computing device, a rendering request to render, within one or more media item containers that correspond to at least one web page, at least a first media item from the collection, the rendering request identifying the collection by the key value. The method also includes transmitting, to the computing device, at least a first media item from the collection for rendering within the one or more media item containers.

In one aspect, the method further includes transmitting, to the computing device, at least a second media item from the collection of one or more media items for rendering within the one or more media item containers. In another aspect of the method, the number of media items transmitted to the computing device does not exceed the number of the one or more media item containers corresponding to at least one web page. In another aspect of the method, the second media item is transmitted to replace the first media item transmitted for rendering within the one or more media item containers. In another aspect of the method, the method further includes billing a vendor at a first billing rate for the step of transmitting the first media item from the collection, and billing the vendor at a second billing rate for the step of transmitting the second media item from the collection. In another aspect of the method, the method further includes paying to the user at least a portion of the first billing rate. In an aspect, the first billing rate is substantially higher than the second billing rate. In another aspect, the transmission of the first media item occurs at a first time and the transmission of the second media item occurs at a second time. In another aspect, the method further comprises billing a vendor on the basis of the differential between the first time and the second time. In another aspect, the method further includes receiving, from the computing device, an identification of a user account, and billing the user account based upon the differential between the first time and the second time. In one aspect, the second media item is an advertisement corresponding to the first media item. In another aspect, the first media item is an advertisement. In another aspect, the method further includes receiving, from the computing device, a collection request to identify the collection. In one aspect, receiving the collection request comprises receiving indicia for identifying the collection. In yet another aspect, the indicia defines a category or includes a keyword. In another aspect, the method further includes receiving, from the computing device, an identification of a user account. In yet another aspect, the method further includes billing the user account for the step of identifying the collection. In still yet another aspect, the method includes receiving compensation from the user account. In another aspect, the compensation is monetary compensation. In yet another aspect, the key value identifies the user account. In another aspect, the method further includes receiving, from the computing device, an identification of a user account. In another aspect, the method further includes billing the user account for the step of transmitting the first media item from the collection. In yet another aspect, the method further includes billing a vendor for the step of transmitting the first media item from the collection. In still yet another aspect, the method includes paying to the user at least a portion of the amount billed to the vendor. In another aspect, the first media item includes a rendering priority and the method further comprises, on the basis of the rendering priority, rendering the first media item within at least one of the one or more media item containers.

In another example (which example is intended to be illustrative and not restrictive), the present invention may be considered a method for publishing collections of media items. The method includes assembling a plurality of media items into a collection, the media items including at least one common indicia. The method further includes publishing the at least one common indicia. The method also includes receiving, from a computing device, a first request identifying the at least one common indicia. The method additionally includes identifying the collection by a key value associated with the first request. The method still further includes transmitting the key value to the computing device. The method yet further includes transmitting at least a first media item within the collection to the computing device.

In one aspect, the method further comprises receiving, from the computing device, a second request identifying the key value, and transmitting at least a second media item within the collection to the computing device. In another aspect, the at least one of the plurality of media items within the collection is transmitted more frequently than any other of the plurality of media items within the collection. In yet another aspect, the at least one common indicia corresponds to a category, a keyword, the frequency of transmission, or a vendor billing rate. In still yet another aspect, transmitting at least the first media item to the computing device is triggered by a request for at least the first media item corresponding to the key value that identifies the collection.

In yet another example (which example is intended to be illustrative and not restrictive), the present invention may be considered a system for rendering a collection of media items. The system includes a media item repository that stores collections of one or more media items, each of the collections identified by a key value. The system further includes a media request module that receives, from a computing device, a rendering request to render at least a first media item from a collection, the rendering request identifying the collection by its key value. The system includes a media search module that retrieves at least the first media from the collection. The system yet further includes a media transmission module that transmits, to the computing device, at least the first media item for rendering within one or more media item containers that correspond to at least one web page.

In one aspect, the system further includes a media item upload module that receives media items for storage as part of one or more collections of one or more media items. In yet another aspect, the system further includes a media item publication module that publishes a common metadata attribute for the one or more collections of one or more media items.

These and various other features as well as advantages will be apparent from a reading of the following detailed description and a review of the associated drawings. Additional features are set forth in the description which follows, and in part will be apparent from the description, or may be learned by practice of the described embodiments. While it is to be understood that both the foregoing general description and the following detailed description are exemplary and explanatory, the benefits and features will be realized and attained by the structure particularly pointed out in the written description and claims hereof as well as the appended drawings.

BRIEF DESCRIPTION OF THE DRAWINGS

The following drawing figures, which form a part of this application, are illustrative of embodiments of systems and methods described below and are not meant to limit the scope of the invention in any manner, which scope shall be based on the claims appended hereto.

DETAILED DESCRIPTION

As set forth in this disclosure, including the claims and figures appended hereto, a media item may take many forms. For example, a media item may be comprised of audio, video, imagery, text, or other data in the form of electronic files. Typically, a media item may be rendered (i.e., played, displayed or consumed) in a variety of ways. For example, a media item may be comprised of an audio file (e.g., an MP3 audio file) that may be rendered (e.g., played) using audio playback hardware and/or software. Similarly, a media item comprised of a compressed video file may be rendered (e.g., decompressed and played) using a video decoder and playback engine. In some cases, media items may be encapsulated within other media items. For example, a media item comprising a portion of text (e.g., a movie title) may be embedded within another media item (e.g., a streaming MPEG-2 video file). One skilled in the art will recognize that media items may take many forms that are within the scope of this disclosure.

Additionally, as further set forth in this disclosure, including the claims and figures appended hereto, rendering may take place on a variety of computing devices. For example, computing devices may include, but are not limited to, personal computers, mobile computers (i.e., laptops or mobile phones), televisions, set-top-boxes, and personal digital assistants. Typically, computing devices will include a processor and memory for storing data and software. Computing devices may also be provided with operating systems that allow execution of software programs and manipulation of data. As set forth herein, computing devices may communicate using many types of networks, including but not limited to wired and wireless data connections (e.g., computing devices may interconnect via wired connections to the Internet). One skilled in the art will recognize that computing devices and networks may take many forms that are within the scope of this disclosure.

Figure 1:
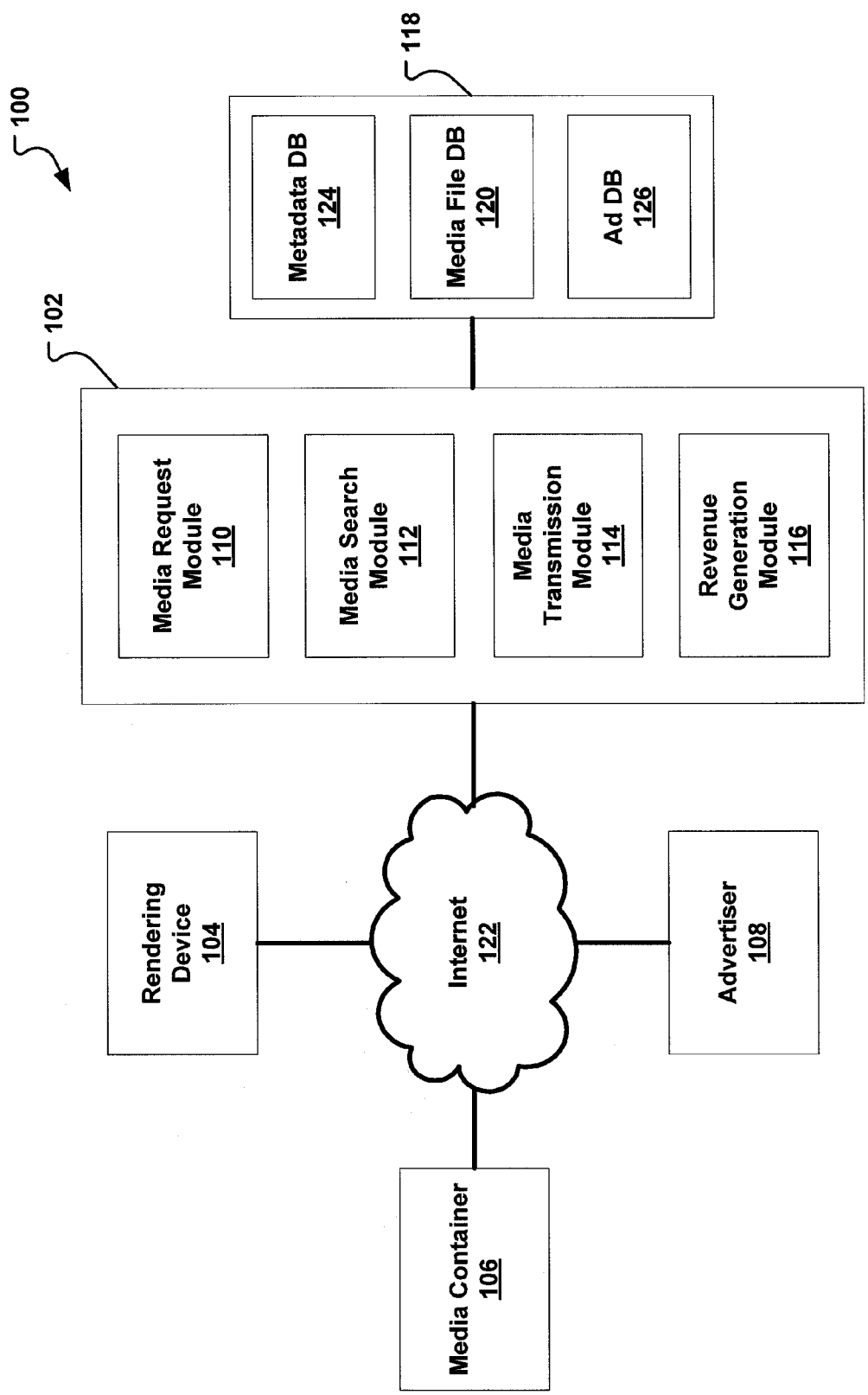
FIG. 1 illustrates an embodiment of a system for rendering a collection of media items.

FIG. 1 illustrates an embodiment of a system for rendering a collection of media items. The system 100 is a computing architecture wherein media items included within or referenced by one or more media containers 106 may be rendered by a rendering device 104. The system 100 illustrates one embodiment of a system that may include a connection to the Internet 122 such that a media item repository 102 communicates with a rendering device 104, media container 106 and/or an advertiser 108. In one embodiment, a connection to the Internet 122 may comprise one or more wired or wireless connections utilizing a Wi-Fi (802.11a/b/g) network, a WiMAX (802.16) network, a satellite network, and/or a cellular network. One skilled in the art will recognize that many permutations and configurations of a system 100 are available and within the scope of this disclosure.

The system 100 includes a media container 106 for rendering one or more media items. In one embodiment, media containers 106 may include one or more web page elements for rendering text, images, video or audio. For example, a media container 106 may be comprised of an image reference ("HREF") tag identifies a media items in a collection. As another example, a media container 106 may also be comprised of a uniform resource locator ("URL") that identifies one or more media items in a collection. In one embodiment, a media container 106 may specify a key associated with the collection of media items. For example, a web page including media containers for a collection of current news stories may use a key common to the current news stories such that when the key is sent to a media request module 110 the key may be used to locate the current news stories.

As set forth in the embodiment illustrated by FIG. 1, a system 100 may include a media item repository 102. The media item repository 102 may include a number of modules, including but not limited to programs and data, for storing, identifying and transmitting collections of one or more media items. Collections of media items may be ordered into a transmission queue. In the present embodiment, the media item repository 102 includes a media request module 110 that, among other operations, may receive a rendering request to render at least a first media item from a collection. The rendering request received by the media request module 110 may be transmitted by a computing device such as a computing device associated with a rendering device 104 or a media container 106. The rendering request may identify a collection by key value or by some other indicia such as text or image properties that are common to media items within the collection. In one embodiment, a key value may be generated by the media item repository 102 upon receipt of a media item request at a media request module 110. The key value may comprise a hash value, alpha-numeric value, or other value for associating one or more media items to a media item request. In one embodiment, a media item request may be transmitted by a rendering device (e.g., an Internet browser) that may be attempting to render media items corresponding to one or more media item containers. For example, a browser trying to render media items within a media container 106 on a web page may transmit a media item request to the media request module 110. Alternately, one or more media containers 106 may generate a media item request to the media request module 110.

A media item repository 102 also includes a media search module 112 that may search one or more databases (as discussed below) stored in a media item storage module 118 for media items, for example, that correspond to a search criteria or key value. For example, a media item request received by a media request module 110 may include indicia or metadata such as a title, format, description, etc. associated with a stored media item. The media search module 112 may then search one or more media items to retrieve the one or more media items that include the indicia or metadata.

A media item repository 102 also includes a media transmission module 114 that transmits at least a first media item for rendering within one or more media item containers that correspond to at least one web page. In one embodiment, for example, the media transmission module 114 receives confirmation from the media search module 112 that one or more media items match a media item request. The media transmission module 114 may then transmit one or more media items from the collection for rendering within the one or more media containers. Transmission of media items may occur in a variety of ways, including but not limited to transmissions of media items in a collection using a random order, a pre-selected order or some other order. For example, media items that result in higher market penetration or popularity may be transmitted to one or more media containers before media items with lower market penetration or that are less popular.

The system 100 further includes a media item storage module 118 that may be comprised of one or more databases, such as a metadata database 124, media file database 120, and advertising database 126, that may reside on one or more mass storage devices (not shown) that are connected to or are part of one or more computing devices. Mass storage devices include some form of computer-readable media and typically provide non-volatile storage of data for later use by one or more computing devices. While this disclosure describes computer-readable media with respect to a hard disk or CD-ROM drive, it should be appreciated by those of ordinary skill in the art that computer-readable media can be any available media that can be accessed by one or more computing devices. By way of example, and not of limitation, computer-readable media may comprise computer storage media and communication media. Computer storage media includes volatile and non-volatile, removable and non-removeable media implemented by any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, rewritable DVD, or other optical storage, magnetic storage or other storage mediums which may be used to store information and can be accessed by a computing device.

In one embodiment, a metadata database 124 may store information corresponding to media items, such as the title, description or other information related to a media item. Similarly, an advertising database may store information received from an advertiser 108 that is related to media items stored in a media file database 120. For example, a media item may be comprised of one or more images used in an advertisement and the advertising database 126 may include information specifying the length of time for rendering the media items by a rendering device 104 or the transmission ordering for transmitting the media items by a media transmission module 114. One skilled in the art will recognize that many way of storing media items and information associated with media items exist and are within the scope of this disclosure.

Embodiments of a system 100 for rendering a collection of media items may be more easily illustrated by way of example. In one example, a holder of media items may desire to make media items available for a limited period of time. Where the holder comprises an advertiser of cars, for example, the advertiser 108 may wish to make certain images and/or text related to a monthly car sale available for the month-long period. In this example, the advertiser 108 may request media items via a media request module 110. The media request module 110 then communicates with a media search module 112 to locate media items matching the description of cars advertised within the month-long period. Media items in the form of text describing the cars and pictures of the cars that are responsive to the media item request may then be grouped into a collection that is identified by a key value. The media request module 110 then returns the key value to the advertiser for insertion into one or more media containers 106. When a user of a rendering device 104 navigates to a web page corresponding to the one or more media containers 106, the media containers 106 may then request the one or more media items of the collection from the media item repository 102. A media transmission module 112 then transmits at least one media item (e.g., the text or image related to the cars) for rendering within the one or more media containers 106. The system 100 may thus allow advertisers, for example, to vary the media items that are associated with a collection's key value and renderable within the one or more media containers 106.

As another example of a system 100, it may be desirable to vary the rendering of media items during a time period. For example, one or more media containers may be used to render the daily news, a weekly comic strip, a serial publication, special-interest programming or some other periodically changing information. Similarly, an advertiser may wish to periodically change the advertisements rendered within one or more media containers that are incorporated in a web page. For example, an ad campaign may be designed to display a series of related advertisements over time or advertisements may be changed over time where such advertisements do not generate sufficient user interest. In each case, referencing a collection key value by the one or more media containers 106 permits the updating of media items corresponding to the collection without the need for changing hard-coded access to media items.

Rendering of media items within a collection identified by a key value may also permit the advertiser, for example, to determine when or how often media items are actually rendered within a web page. For example, transmitting one or more media items by a media transmission module 114 may permit tracking of the frequency, number, placement and rendering of specific media items transmitted to the one or more media containers 106.

Figure 2:
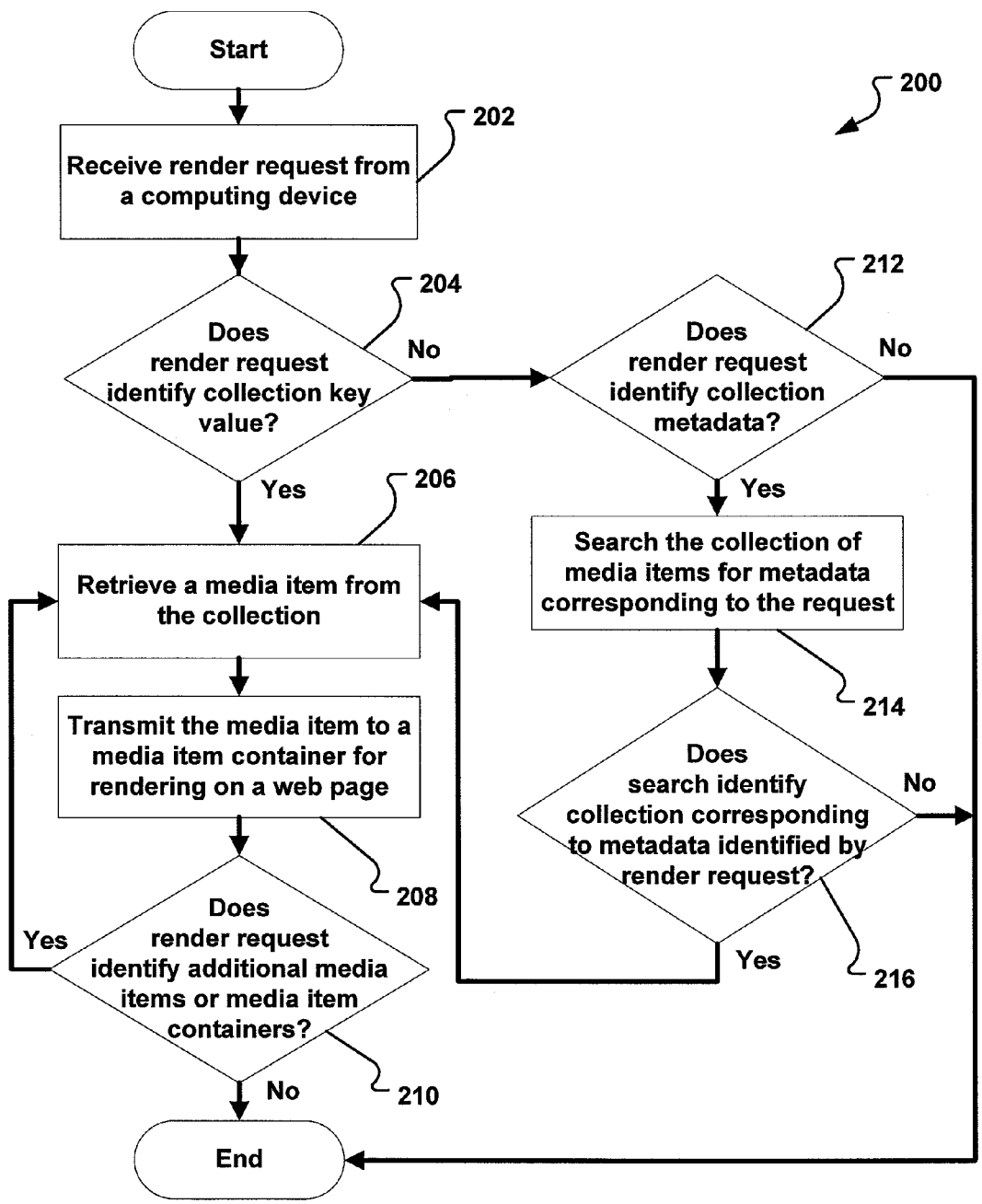
FIG. 2 illustrates a flowchart of an embodiment of a method for rendering a collection of media items.

FIG. 2 illustrates a flowchart 200 of an embodiment of a method for rendering a collection of media items. In the flowchart 200, a request to render one or more media items is received in a receiving render request operation 202. The render request operation 202 may identify a key value of a collection, or alternatively, the render request may identify one or more attributes of media items, including but not limited to a location or address, a title, a format, a description, and/or references to other media items. A key value identified as part of render request operation 202 may be comprised of a hash value, a globally unique identifier, or some other identifier. For example, the key value may be a string of characters that is 32 bytes long. In one embodiment, the request may specify a number of media items requested (e.g., where there are more than one media items in a collection) and the period and/or frequency for transmitting additional media items. Collections of media items, or the media items themselves, may include a transmission queue or ordering for transmission of the media items. For example, a collection may include a transmission queue ordering transmission of a first media item before a second media item. As another example, a collection may include a transmission queue ordering transmission of media items at relative times (e.g., transmission of a second media item one week after, and relative to, transmission of a first media item). In yet another example, transmission of media items may correspond to a clock time (e.g., transmission of a first media item at 12:01:00 PM Pacific Standard Time on May 4, 2007). In still yet another example, transmission of a second media item may be temporally related to the transmission of a first media item (e.g., transmission of a "Offer Expired" advertisement may occur after transmission of a "Limited Time Sale" advertisement).

In response to the request, a collection identification operation 204 determines whether the render request operation 202 included information identifying a collection. For example, a preexisting collection key value may identify one or more media items previously associated with a past render request operation 202. In the case of a web page rendering media items associated with a key value, the key value may be embedded as part of a URL address. For example, the key "90857hwet8790235kewr" may be appended to the end of a domain such as "http://socmedads.yahoo.com" that initiates a server-side collection identification operation 204.

If the collection identification operation 204 identifies a collection, a media item retrieval operation 206 retrieves at least one media item from a media item repository. One skilled in the art will recognize that many ways of retrieving media items from a collection are possible and within the scope of this disclosure. For example, retrieval of a media item from a media item repository may include retrieving the last modified media item, retrieving the media item chronologically preceding or following the last transmitted media item, retrieving the media item most often retrieved by other users, and retrieving the most recently created media item. In one embodiment, media item retrieval operation 206 may comprise copying at least a portion of the media item into memory. In another embodiment, an address for accessing the media item may be retrieved by media item retrieval operation 206, such that, for example, the address could be passed to a media container requesting the media item.

In response to retrieving a media item in media item retrieval operation 204, the media item or an address for accessing the media item may be transmitted in a transmitting operation 206. For example, where a media item comprises a streaming video, the video may be streamed to one or more media containers such that it may be rendered by a browser or other rendering device. Similarly, where a media item comprises a frame of streaming video, additional frames corresponding to the key value may also be transmitted by transmitting operation 210 upon confirmation by an additional media items operation 210 that additional media items exist.

In response to determining by collection identification operation 204 that render request operation 202 does not include information identifying a collection, a metadata identification operation 212 identifies whether the request includes other information that may be used to generate or otherwise identify a collection. For example, the request may include key terms such as "convertible" and "automobiles" that may be used to collect together media items including the terms in their title, description, file name or other metadata. Thus, in a searching metadata operation 214 and identifying metadata operation 216, one or more media items may be searched for information that matches literally or is similar to information provided within the request. As another example, metadata associated with one or more media items may specify an advertising time period. Where the request includes information identifying the advertising time period, the associated media items may then be retrieved.

Figure 3:
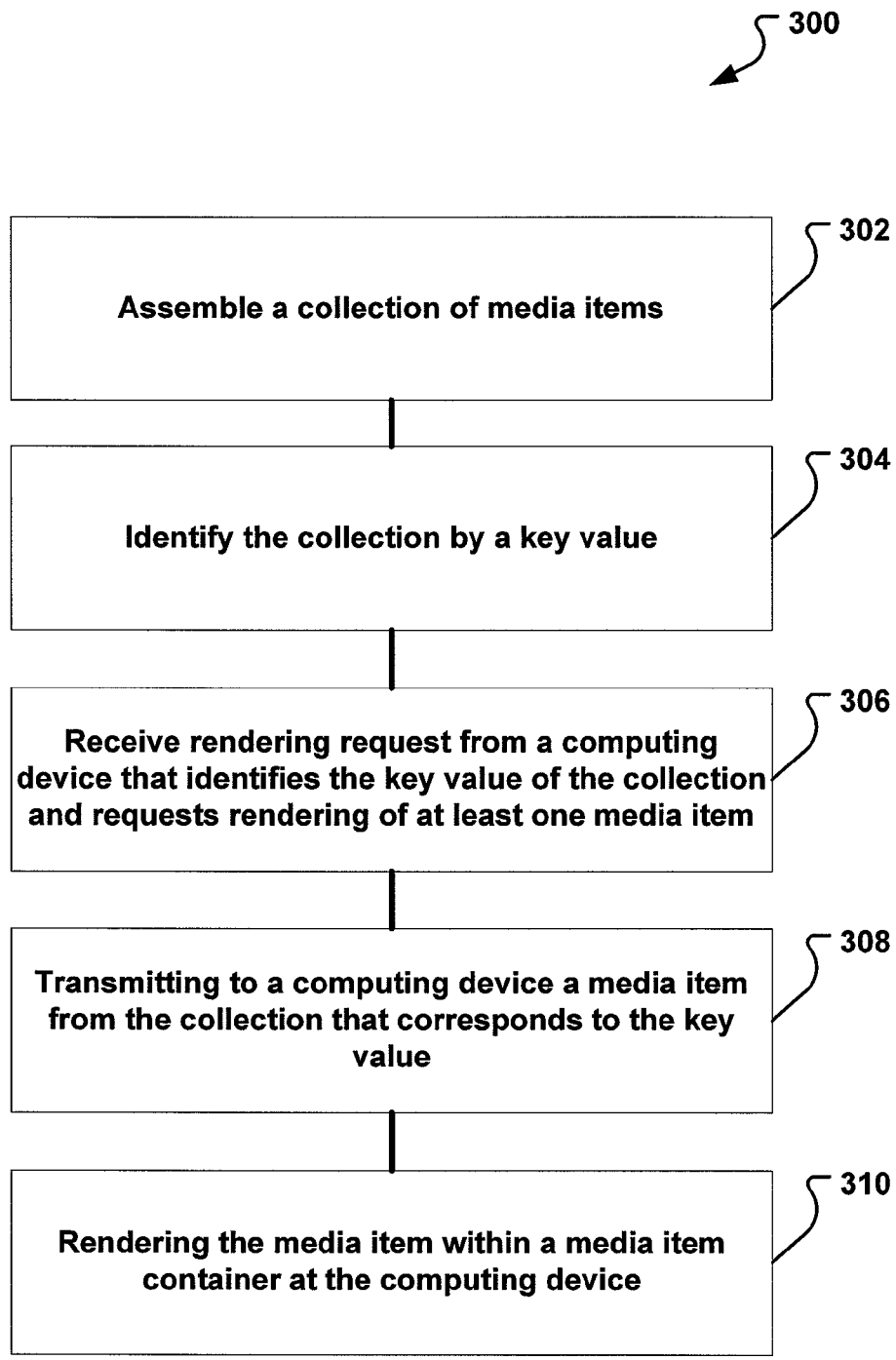
FIG. 3 illustrates an embodiment of a method for rendering a collection of media items.

FIG. 3 illustrates an embodiment of a method 300 for rendering a collection of media items. In the method 300, a collection of one or more media items is assembled in assembling operation 302 such that the collection is identified by a key value in an identifying operation 304. A key may be any identifier for a media item or group of media items. In a receiving operation 306, a rendering request to render at least a first media item from the collection is received from a computing device. The rendering request received from the computing device may include information directing the receiving computing device(s) to render the media item(s) within one or more media item containers that correspond to at least one web page. For example, rendering of the media items may occur within a portion of a web page (e.g., within a frame, frameset, or division ("DIV") portion of a web page), or within a banner ad, applet, or some other media item container. The rendering request may identify the collection by the key value, for example, an alphanumeric string appended to a URL or other information. In a transmission operation 308, the method 300 further includes transmitting, to the computing device, at least a first media item from the collection for rendering, in a rendering operation 310, within the one or more media item containers. For example, transmission of an image (e.g., JPEG photograph) media item to a "DIV" region of a web page may permit the rendering or display of the image by a rendering device.

In one embodiment, the method 300 further comprises transmitting, to the computing device, at least a second media item from the collection of one or more media items for rendering within the one or more media item containers. For example, where a first media item comprises text advertising the terms for the sale of an automobile, the second media item may comprise text advertising the expiration of the sale and/or offering information about another automobile sale. In another embodiment of the method 300, the first media item and/or the second media item may include a rendering priority (e.g., "render first" or "render during the month of April")

for rendering within one or more media item containers. In one aspect of the method 300, the number of media items transmitted to the computing device does not exceed the number of the one or more media item containers corresponding to at least one web page. For example, where two media items containers exist, only one or two media items may be transmitted to the computing device such that at any point in time there are only one (e.g., the same media item rendered in both media item containers) or two media items rendered. In another aspect, the second media item is transmitted to replace the first media item transmitted for rendering within the one or more media item containers. For example, an image of a news story occurring yesterday may be replaced with an image of a news story occurring today. As another example, a greater number of media items may be transmitted than may be rendered within one or more media item containers; the media items may be cached or stored for later rendering on a replacement or substitute basis within the one or more media item containers.

In yet another embodiment, the method 300 further comprises billing a vendor at a first billing rate for the step of transmitting the first media item from the collection, and billing the vendor at a second billing rate for the step of transmitting the second media item from the collection. For example, transmission of the first media item may comprise billing a vendor nothing (e.g., a free transmission), whereas transmission of the second media item may comprise billing the vendor a fee. The fee may take the form of a monetary fee. Alternatively, the fee may take other forms, such as a debit against other online or transmission services. In another example, a vendor (e.g., an advertiser supplying the one or more media items) may be billed for transmission of the first media item (e.g., an advertisement), and billed at a second billing rate (e.g., a reduced rate) for transmission of a second media item indicating the expiration of an advertising campaign. Thus, in another aspect, the first billing rate may be substantially higher than the second billing rate (e.g., the reduced rate). In still yet another embodiment, the method 300 may further comprise paying to a user at least a portion of the first billing rate. For example, a user may provide one or more media items, than a vendor (e.g., an advertiser) may later use to help promote their goods and/or services. In this example, the compensation received from billing the vendor may be distributed, at least in part, back to the user who supplied the one or more media items.

In another aspect of the method 300, the transmission of the first media item may occur at a first time and the transmission of the second media item may occur at a second time. As discussed in a previous example, where the first media item comprises an image associated with a first part (e.g., the initial price of an advertised automobile) of an advertising campaign, the second media item may comprises an image associated with a later part (e.g., reduced price of an automobile). In another embodiment, the method 300 further comprises billing a vendor on the basis of the differential between the first time and the second time. For example, where a second media item replaces the first media item, a vendor may incur little to no charge for updating the first media item within a long time period (e.g., a month or year), whereas an update within a shorter time period (e.g., an hour or day) may incur a charge.

In still yet another embodiment, the method 300 further comprises receiving, from the computing device, an identification of a user account, and billing the user account based upon the differential between the first time and the second time. For example, the frequency of transmission and/or rendering of media items within media item containers associated with a user account may result in a greater or lesser billing to the user account. Where transmission and/or rendering of media items within media item containers occurs within short intervals, the user may be charged less for receiving transmission/rendering of a greater number of media items on their web page. Alternatively, where a user account utilizes media items from a proprietary source (e.g., a news feed), the user account may be charged more for updates occurring within shorter intervals. In another aspect, the second media item is an advertisement corresponding to the first media item.

In an embodiment, the method 300 further comprises receiving a request to identify a collection. In one aspect, receiving a collection request from a computing device comprises receiving indicia for identifying the collection. For example, indicia for identifying a collection may include, but is not limited to, receiving one or more keywords, strings, numbers, billing rates, transmission rates, digital rights, content-use parameters or other descriptive or identifying information. In another aspect, the indicia may define a category (e.g., restaurants near Denver, Colo.). In one embodiment, the method 300 may further comprise billing a user account for the step of identifying the collection. In still yet another embodiment, the method 300 may further comprise receiving compensation from the user account for the step of identifying the collection. For example, monetary compensation may be received for identifying one or more media items corresponding to a request identifying the keywords "Local News, Denver, Colo."

Figure 4:
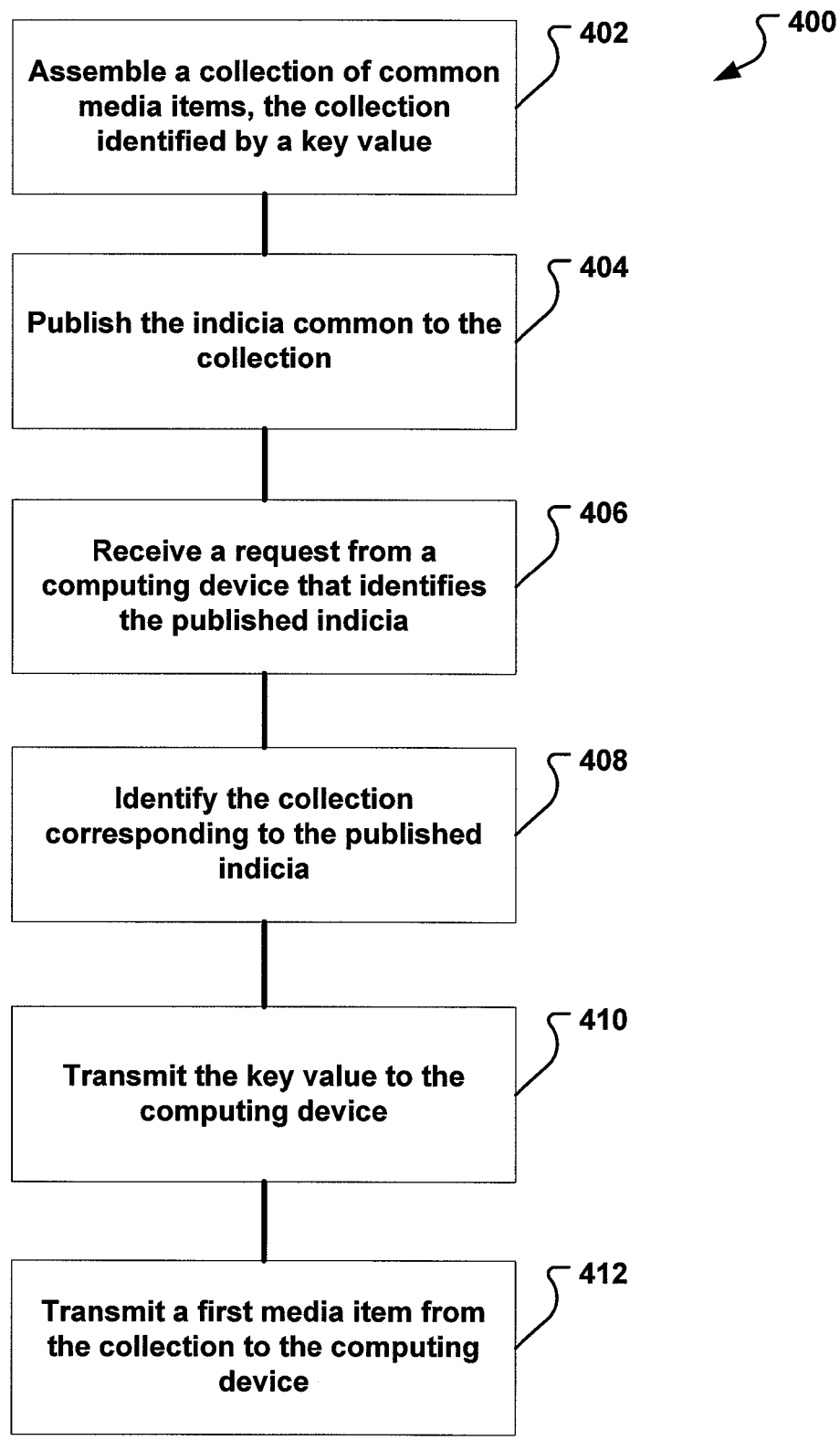
FIG. 4 illustrates an embodiment of a method for publishing collections of media items.

FIG. 4 illustrates an embodiment of a method 400 for publishing collections of media items. In the method 400, a plurality of media items, that include at least one indicia in common, are assembled into a collection in an assembling operation 402. For example, by way of illustration and not of limitation, a plurality of media items may share a common keyword (e.g., automobiles), a common rendering time (e.g., video that renders or plays for thirty (30) seconds), a common date (e.g., created on Apr. 1, 2007), or a common ancestry (e.g., the plurality of media items may set forth an advertising campaign for a vendor). In a publishing operation 404, the method 400 further includes publishing the at least one common indicia. For example, the keywords of a description associated with a video media item may be published such that they can be searched. In a receiving operation 406 of the method 400, a first request identifying the at least one common indicia is then received from a computing device. For example, the first request may identify a particular type of automobile (e.g., a convertible) or a certain type of media item (e.g., an image file). In an identifying operation 408, the method 400 then identifies a collection, that corresponds to the at least one indicia, by a key value associated with the first request. For example, where a plurality of media items include several images of automobiles, a collection of automobile images (in response to a request for the same) may be identified using an alphanumeric key. In a transmitting the key value operation 410, the method 400 then comprises transmitting the key value to the computing device. In a transmitting at least a first media item operation 412, the method 400 further includes transmitting at least a first media item within the collection to the computing device. For example, one of a plurality of automobile images from an automobile image collection may then be transmitted to the computing device. In another embodiment, the method may further comprise receiving, from the computing device, a second request identifying the key value, and transmitting at least a second media item (e.g., a second automobile image) within the collection to the computing device.

In one aspect, the at least one of the plurality of media items within the collection may be transmitted more frequently than any other of the plurality of media items within the collection. For example, where a collection of automobile images is transmitted, images corresponding to the better-selling automobiles (e.g., the less-expensive automobiles) may be transmitted more frequently than images corresponding to more-expensive automobiles. In still yet another aspect of method 400, transmitting at least the first media item to the computing device is triggered by a request for at least the first media item corresponding to the key value that identifies the collection.

Those skilled in the art will recognize that the methods and systems of the present disclosure may be implemented in many manners and as such are not to be limited by the foregoing exemplary embodiments and examples. In other words, functional elements being performed by a single or multiple components, in various combinations of hardware and software or firmware, and individual functions, can be distributed among software applications at either the client or server level or both. In this regard, any number of the features of the different embodiments described herein may be combined into single or multiple embodiments, and alternate embodiments having fewer than or more than all of the features herein described are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, and those variations and modifications that may be made to the hardware or software or firmware components described herein as would be understood by those skilled in the art now and hereafter.

While various embodiments have been described for purposes of this disclosure, various changes and modifications may be made which are well within the scope of this disclosure. For example, media items sharing common digital rights management attributes (e.g., copy-once or copy-never) may be collected. As another example, media items sharing common rendering characteristics (e.g., black-and-white image media items) may be collected as well. Numerous other changes may be made which will readily suggest themselves to those skilled in the art and which are encompassed in the spirit of this disclosure and as defined in the appended claims.

What is claimed is:

1. A method comprising:
assembling, at a repository, a collection of one or more media items, the collection identified by a key value;
receiving, at a computing device, a rendering request to render at least a first media item from the collection within one or more media item containers that correspond to at least one web page, the rendering request comprising metadata associated with the one or more media items of the collection, wherein the key value comprises values for associating the rendering request with at least the first media item from the collection and controlling rendering of at least the first media item which includes identifying a media item container for rendering at least the first media item;
identifying, via the computing device, at least said first media item based on the key value, the key value associates the received metadata to the one or more media items; and
transmitting, over a network, at least said first media item from the collection for rendering within the one or more media item containers, wherein said rendering of at least said first media item is contingent upon the key value.

2. The method of claim 1 further comprising:
transmitting, over the network, at least a second media item from the collection of one or more media items for rendering within the one or more media item containers.

3. The method of claim 2 wherein the number of media items transmitted does not exceed the number of the one or more media item containers corresponding to at least one web page.

4. The method of claim 2 wherein the second media item is transmitted to replace the first media item transmitted for rendering within the one or more media item containers.

5. The method of claim 2 further comprising:
billing a vendor at a first billing rate for the step of transmitting the first media item from the collection; and
billing the vendor at a second billing rate for the step of transmitting the second media item from the collection.

6. The method of claim 5 further comprising:
paying a user at least a portion of the first billing rate.

7. The method of claim 5 wherein the first billing rate is substantially higher than the second billing rate.

8. The method of claim 2 wherein transmission of the first media item occurs at a first time and the transmission of the second media item occurs at a second time.

9. The method of claim 8 further comprising:
billing a vendor on the basis of the difference between the first time and the second time.

10. The method of claim 9 further comprising:
receiving, from the computing device, an identification of a user account; and
billing the user account based upon the difference between the first time and the second time.

11. The method of claim 2 wherein the second media item is an advertisement corresponding to the first media item.

12. The method of claim 11 wherein the first media item is an advertisement.

13. The method of claim 2 wherein transmitting the second media item comprises:
identifying a transmission queue corresponding to the collection, the transmission queue ordering transmission of the second media item after transmission of the first media item.

14. The method of claim 13 wherein identifying the transmission queue further comprises:
identifying a transmission time that corresponds to the transmission of the second media item.

15. The method of claim 14 wherein the transmission time of the second media item corresponds to a transmission time of the first media item.

16. The method of claim 1 further comprising:
receiving, at the computing device, a collection request to identify the collection.

17. The method of claim 16 wherein receiving the collection request comprises:
receiving indicia for identifying the collection.

18. The method of claim 17 wherein the indicia defines a category.

19. The method of claim 17 wherein the indicia includes a keyword.

20. The method of claim 16 further comprising:
receiving, at the computing device, an identification of a user account.

21. The method of claim 20 further comprising:
billing the user account for the step of identifying the collection.

22. The method of claim 21 further comprising:
receiving compensation from the user account.

23. The method of claim 22 wherein the compensation is monetary compensation.

24. The method of claim 20 wherein the key value identifies the user account.

25. The method of claim 1 further comprising:
receiving, at the computing device, an identification of a user account.

26. The method of claim 25 further comprising:
billing the user account for the step of transmitting the first media item from the collection.

27. The method of claim 1 further comprising:
billing a vendor for the step of transmitting the first media item from the collection.

28. The method of claim 27 further comprising:
paying a user at least a portion of the amount billed to the vendor.

29. The method of claim 1 wherein the first media item includes a rendering priority and the method further comprises:
on the basis of the rendering priority, rendering the first media item within at least one of the one or more media item containers.

30. A method comprising:
assembling, at a repository, a plurality of media items into a collection, the media items including at least one common indicia;
publishing, over a network, the at least one common indicia;
receiving, at a computing device, a first request identifying the at least one common indicia;
generating, via the computing device, a key value based upon receipt of the first request;
identifying, via the computing device, the collection by the key value associated with the first request, the key value comprising values for associating the first request with at least one of the media items from the collection and controlling rendering of the at least one media item which includes identifying a media item container within a web page for said rendering of the at least one media item;
transmitting, over the network from the computing device, the key value to a client device; and
transmitting, over the network from the computing device, at least a first media item within the collection to the client device, wherein the at least said first media item is rendered contingent upon values identified by the key value.

31. The method of claim 30 further comprising:
receiving, at the computing device, a second request identifying the key value; and
transmitting at least a second media item within the collection to the client device.

32. The method of claim 30 wherein the at least one of the plurality of media items within the collection is transmitted more frequently than any other of the plurality of media items within the collection.

33. The method of claim 30 wherein the at least one common indicia corresponds to a category.

34. The method of claim 30 wherein the at least one common indicia corresponds to a keyword.

35. The method of claim 30 wherein the at least one common indicia corresponds to a frequency of transmission.

36. The method of claim 30 wherein the at least one common indicia corresponds to a vendor billing rate.

37. The method of claim 30 wherein transmitting at least the first media item to the client device is triggered by a request for at least the first media item corresponding to the key value that identifies the collection.

38. A system comprising:
a plurality of processors;
a media item repository that stores collections of one or more media items, each of the collections identified by a key value;
a media request module implemented by at least one of said plurality of processors that receives a rendering request to render at least a first media item from a collection, the rendering request comprising metadata associated with the one or more media items of the collection, wherein the key value comprises values for associating the rendering request with at least one of the media items from one or more collections and controlling rendering of the at least one media item which includes identifying a media item container from one or more media item containers for rendering of the at least one media item;
the media request module identifying at least said first media item based on the key value, the key value associates the received metadata to the one or more media items;
a media search module implemented by at least one of said plurality of processors that retrieves at least the first media item from the collection over a network; and
a media transmission module implemented by at least one of said plurality of processors that transmits over the network, to a client device, at least the first media item for rendering within said one or more media item containers that correspond to at least one web page, wherein said rendering of at least said first media item is contingent upon values identified by the key value.

39. The system of claim 38 further comprising:
a media item upload module that receives media items for storage as part of the one or more collections of one or more media items.

40. The system of claim 38 further comprising:
a media item publication module that publishes a common metadata attribute for the one or more collections of one or more media items.

* * * * *